United States Patent [19]

Leitch et al.

[11] Patent Number: 5,546,411
[45] Date of Patent: Aug. 13, 1996

[54] METHOD AND APPARATUS FOR ADAPTIVELY SELECTING A COMMUNICATION STRATEGY IN A SELECTIVE CALL RADIO COMMUNICATION SYSTEM

[75] Inventors: Clifford D. Leitch, Coral Springs; Robert J. Schwendeman, Pompano Beach; Philip P. Macnak, West Palm Beach, all of Fla.

[73] Assignee: Motorola, Inc., Schaumburg, Ill.

[21] Appl. No.: 396,304

[22] Filed: Feb. 28, 1995

[51] Int. Cl.⁶ .......................... H04B 7/0005; H04B 7/26
[52] U.S. Cl. .......................... 371/5.5; 371/41; 455/67.3; 455/69
[58] Field of Search .................. 371/5.5, 41; 455/54.1, 455/67.3, 69

[56] References Cited

U.S. PATENT DOCUMENTS

| | | | |
|---|---|---|---|
| 4,580,262 | 4/1986 | Naylor et al. | 371/5.5 |
| 4,825,193 | 4/1989 | Siwiak et al. | 340/311.1 |
| 4,829,519 | 5/1989 | Scotton et al. | 371/5.5 |
| 4,939,731 | 7/1990 | Reed et al. | 371/32 |
| 4,972,439 | 11/1990 | Kuznicki et al. | 375/296 |
| 4,991,184 | 2/1991 | Hashimoto | 375/219 |
| 5,036,515 | 7/1991 | Freeburg | 371/5.5 |
| 5,054,035 | 10/1991 | Tarallo et al. | 375/225 |
| 5,093,924 | 3/1992 | Toshiyuki et al. | 455/33 |
| 5,128,942 | 7/1992 | Kojima | 370/13 |
| 5,128,965 | 7/1992 | Henriksson | 375/285 |
| 5,260,700 | 11/1993 | Merchant et al. | 340/825.44 |
| 5,375,123 | 12/1994 | Andersson et al. | 370/95.1 |
| 5,465,398 | 11/1995 | Flammer | 455/69 |

Primary Examiner—Stephen M. Baker
Attorney, Agent, or Firm—R. Louis Breeden

[57] ABSTRACT

A method and apparatus adaptively selects a communication strategy for communicating a message in a selective call radio communication system including a fixed portion (100) and a portable portion (101). The fixed portion (100) transmits (402) an alert signal to the portable portion (101), and awaits (404) an acknowledgment signal including a signal quality estimate from the portable portion (101). The portable portion (101) receives (602) the alert signal, and computes (604, 606) the signal quality estimate therefrom. The portable portion (101) then sends (608) the acknowledgment signal to the fixed portion (100). In response to the acknowledgment signal, the fixed portion (100) selects (407) a transmission strategy in accordance with the signal quality estimate. For compatibility, the transmission strategy requires a matching reception strategy in the portable portion (101). After sending the acknowledgment signal, the portable portion (101) selects (609) the matching reception strategy in accordance with the signal quality estimate sent in the acknowledgment signal without requiring further communication with the fixed portion (100).

16 Claims, 6 Drawing Sheets

400

500

600

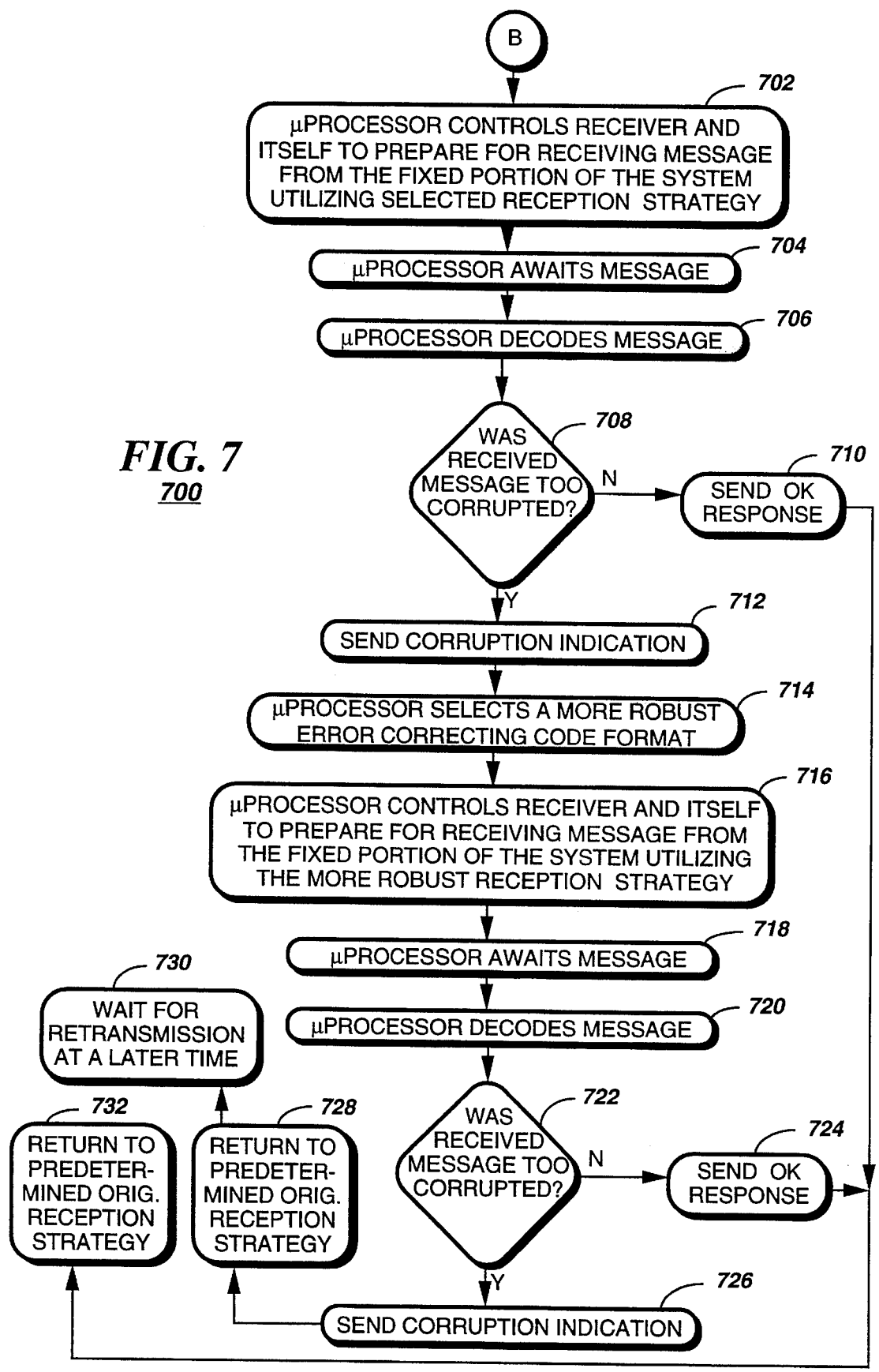

METHOD AND APPARATUS FOR ADAPTIVELY SELECTING A COMMUNICATION STRATEGY IN A SELECTIVE CALL RADIO COMMUNICATION SYSTEM

FIELD OF THE INVENTION

This invention relates in general to selective call radio communication systems, and more specifically to a method and apparatus for adaptively selecting a communication strategy in such systems.

BACKGROUND OF THE INVENTION

In a radio message delivery system, e.g., a selective call radio communication system, received signal quality varies depending on characteristics of the radio transmission channel. The received signal quality depends on many factors including distance from transmitter to receiver, fading, multipath, interference, etc. The channel conditions are different for receiver units located at different points in space. Some receiver units may receive perfect messages while other users may receive messages which are too corrupted by the transmission channel to be usable.

The messages may consist of voice, text, numeric data, graphical data, or other types of message. Message delivery quality may be unsatisfactory because a receiver unit is in a weak signal area or is completely out of range. Interference from other transmitters can also cause message delivery quality to be unsatisfactory. In addition, the receiver unit can be turned off, thus causing all messages to be missed.

Conventional paging systems utilize a communication strategy designed to deliver a usable quality signal, nearly all the time, to nearly all points in the intended coverage area. Unfortunately, such a system design is incompatible with achieving maximum throughput efficiency and economy of system design.

Thus, what is needed is method and apparatus for adaptively selecting a communication strategy in a selective call radio communication system. Preferably, the communication strategy is selected in accordance with achieving maximum throughput efficiency and economy of system design.

SUMMARY OF THE INVENTION

An aspect of the present invention is a method of adaptively selecting a communication strategy for communicating a message in a selective call radio communication system comprising a fixed portion and a portable portion. The method comprises in the fixed portion the steps of transmitting, by utilizing a predetermined original transmission strategy, an alert signal to the portable portion, and thereafter awaiting an acknowledgment signal comprising a signal quality estimate from the portable portion. The method further comprises in the fixed portion the step of selecting, in response to receiving the acknowledgment signal, a transmission strategy for sending the message from a plurality of predetermined transmission strategies corresponding to a plurality of ranges of value of the signal quality estimate. The transmission strategy is selected in accordance with the signal quality estimate, and the transmission strategy requires a matching reception strategy in the portable portion for compatibility. The method further comprises in the portable portion the steps of receiving the alert signal by utilizing a predetermined original reception strategy, and computing the signal quality estimate based at least in part upon the alert signal as received. The method further comprises in the portable portion the steps of sending the acknowledgment signal to the fixed portion after computing the signal quality estimate, and thereafter selecting the matching reception strategy for receiving the message from a plurality of predetermined reception strategies corresponding to the plurality of ranges of value of the signal quality estimate. The reception strategy is selected in accordance with the signal quality estimate sent in the acknowledgment signal without requiring further communication with the fixed portion.

Another aspect of the present invention is an apparatus in a fixed portion of a selective call radio communication system comprising the fixed portion and a portable portion. The apparatus is for adaptively selecting a communication strategy for communicating a message. The apparatus comprises a transmitter for transmitting, by utilizing a predetermined original transmission strategy, an alert signal to the portable portion, and a receiver for receiving an acknowledgment signal comprising a signal quality estimate sent from the portable portion in response to the alert signal. The apparatus further comprises a controller coupled to the transmitter and coupled to the receiver for controlling the transmitter and receiving the acknowledgment signal from the receiver. The controller comprises a selector for selecting, in response to receiving the acknowledgment signal, a transmission strategy for sending the message from a plurality of predetermined transmission strategies corresponding to a plurality of ranges of value of the signal quality estimate. The transmission strategy is selected in accordance with the signal quality estimate, and the transmission strategy requires a matching reception strategy in the portable portion for compatibility. The controller further comprises a sender coupled to the selector for controlling the transmitter to send to the portable portion the message by utilizing the transmission strategy selected by the selector without informing the portable portion that the transmission strategy is being utilized.

Another aspect of the present invention is a selective call transceiver for adaptively selecting a communication strategy for communicating information including an alert signal and a message in a selective call radio communication system comprising a fixed portion and the selective call transceiver. The selective call transceiver comprises an antenna for intercepting a radio signal utilizing a predetermined original reception strategy, and a receiver element coupled to the antenna for demodulating the radio signal to produce a demodulated signal comprising the alert signal. The selective call transceiver further comprises a microprocessor coupled to the receiver element for decoding the demodulated signal to derive the information, and a signal quality estimation element coupled to the receiver element and coupled to the microprocessor for computing a signal quality estimate based at least in part upon the alert signal as received from the fixed portion. The selective call transceiver further comprises a transmitter coupled to the microprocessor for sending an acknowledgment signal comprising the signal quality estimate to the fixed portion in response to receiving the alert signal, and a selector coupled to the microprocessor for selecting a reception strategy for receiving the message from a plurality of predetermined reception strategies corresponding to a plurality of ranges of value of the signal quality estimate. The reception strategy is selected in accordance with the signal quality estimate sent in the acknowledgment signal without requiring further communication with the fixed portion, and is uniquely compatible with a transmission strategy selected by the fixed portion in accordance with the signal quality estimate.

BRIEF DESCRIPTION OF THE DRAWINGS

FIGS. 6 and 7 are flow charts depicting operation of the selective call transceiver in accordance with the preferred embodiment of the present invention.

DESCRIPTION OF THE PREFERRED EMBODIMENT

Figure 1:
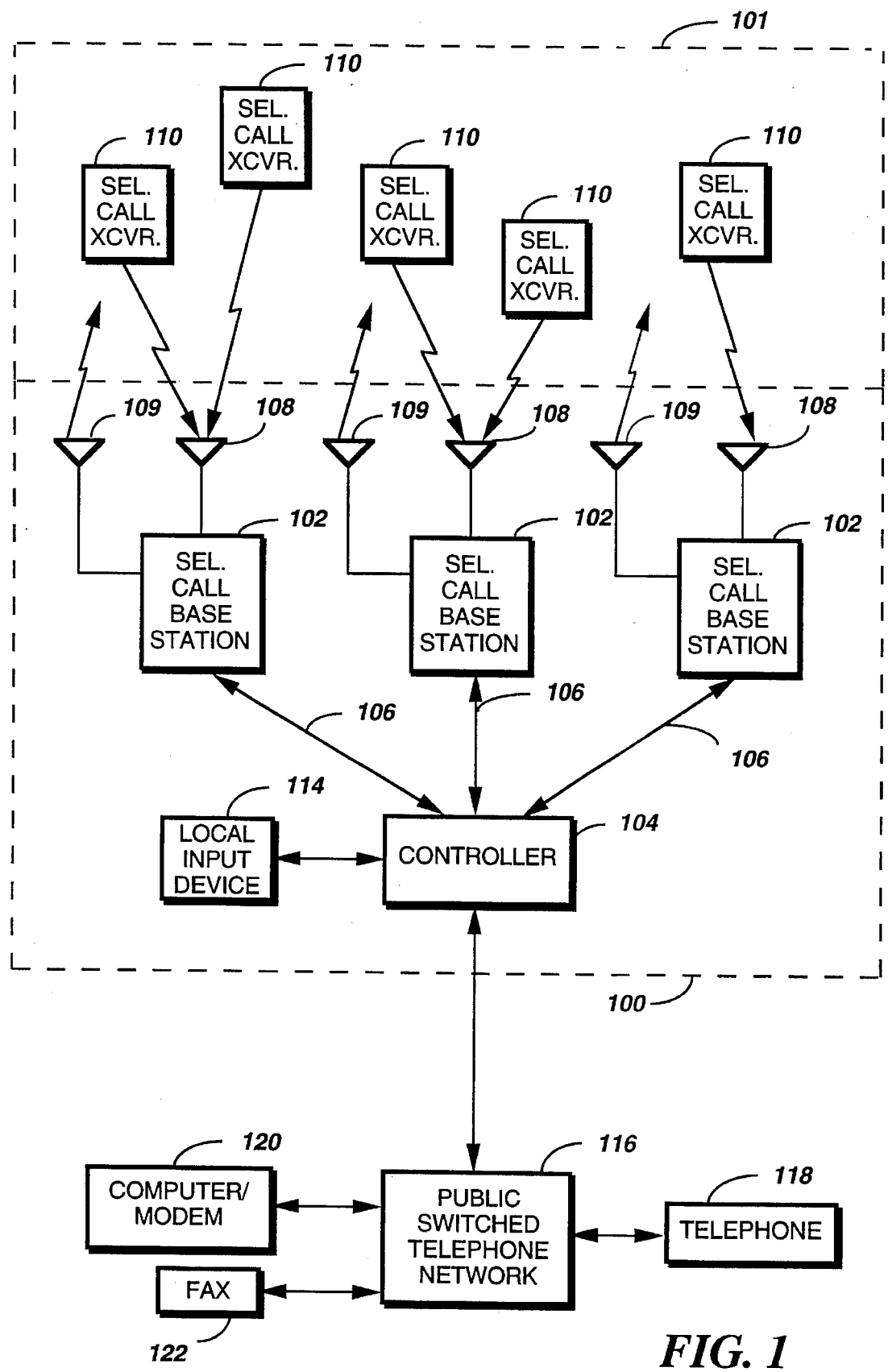
FIG. 1 is an electrical block diagram of a selective call radio communication system in accordance with the preferred embodiment of the present invention.

With reference to FIG. 1, an electrical block diagram of a selective call radio communication system in accordance with the preferred embodiment of the present invention comprises a fixed portion 100 and a portable portion 101. The fixed portion comprises a plurality of conventional selective call base stations 102 coupled by communication links 106 to a controller 104 for controlling the selective call base stations 102. The hardware of the controller 104 is preferably similar to the MPS 2000™ paging control center manufactured by Motorola, Inc. of Schaumburg, Ill. Other similar controller hardware can be utilized as well for the controller 104. The controller 104 comprises a plurality of firmware elements in accordance with the preferred embodiment of the present invention, as will be described further below.

Each of the selective call base stations 102 transmits radio signals to the portable portion 101 comprising a plurality of selective call transceivers 110 via a transmitting antenna 109. The selective call base stations 102 each receive radio signals from the plurality of selective call transceivers 110 via a receiving antenna 108. The radio signals comprise selective call addresses and messages transmitted to the selective call transceivers 110 and acknowledgments received from the selective call transceivers 110. It will be appreciated that the selective call transceivers 110 can also originate messages other than acknowledgments. The controller 104 preferably is coupled to a local input device 114, e.g., a conventional keyboard/display terminal, for accepting selective call originations therefrom and is coupled to the public switched telephone network (PSTN) 116 for receiving selective call originations therefrom. Selective call originations from the PSTN 116 can be generated, for example, from a conventional telephone 118, a conventional computer/modem 120, or a conventional facsimile machine 122 coupled to the PSTN 116 in a manner that is well known in the art.

Transmissions between the selective call base stations 102 and the selective call transceivers 110 preferably utilize a well-known selective calling signaling protocol, such as the Motorola FLEX™ protocol. It will be appreciated that other protocols such as the Golay Sequential Code (GSC) or Post Office Code Standardization Advisory Group (POCSAG) protocol can be utilized as well. These protocols utilize well-known error detection and error correction techniques and are therefore tolerant to bit errors occurring during transmission, provided that the bit errors are not too numerous in any one code word. FLEX™, for example, utilizes a 32/21 Bose-Chadhuri-Hocquenghem (BCH) code word comprising 21 information bits and 11 parity bits. This code word can be processed in a well-known manner to correct up to two bit errors occurring within the code word, and to determine whether there are too many bit errors in the code word for the error correction algorithm to correct, thereby leaving uncorrectable errors in the code word.

Forward channel transmissions from the selective call base stations 102 preferably utilize four-level frequency shift keyed (FSK) modulation, operating at sixteen-hundred or thirty-two-hundred symbols-per-second (sps), depending on a decision made in accordance with the preferred embodiment of the present invention, as described herein below. Reverse channel transmissions from the selective call transceivers 110 to the selective call base stations 102 preferably utilize binary FSK modulation at a rate of eight-hundred bits per second (bps). Reverse channel transmissions preferably occur during predetermined data packet time slots synchronized with the forward channel transmissions. It will be appreciated that, alternatively, other signaling protocols, modulation schemes, and transmission rates can be utilized as well for either or both transmission directions. The forward and reverse channels preferably operate on a single carrier frequency utilizing well-known time division multiplex (TDM) techniques for sharing the frequency. It will be appreciated that, alternatively, the forward and reverse channels can operate on two different carrier frequencies without requiring the use of TDM techniques.

Figure 2:
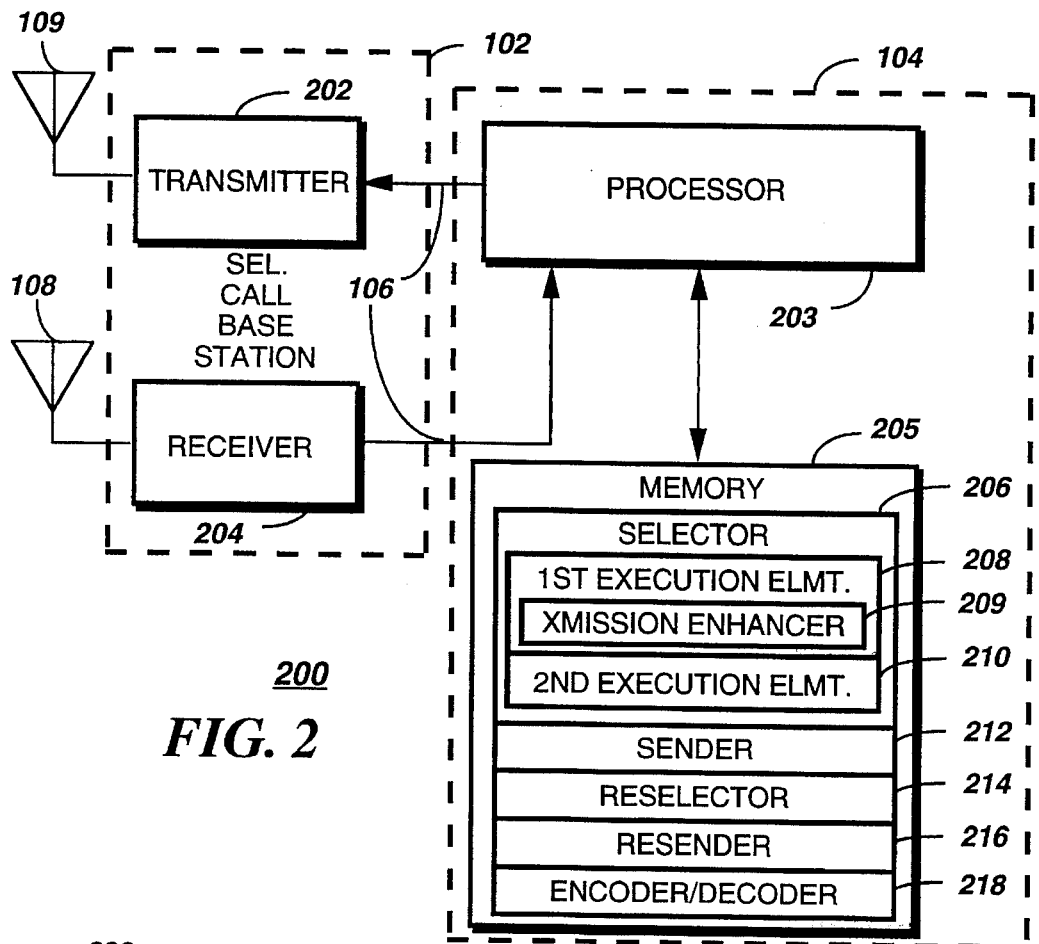
FIG. 2 is an electrical block diagram of portions of a controller and a selective call base station in accordance with the preferred embodiment of the present invention.

FIG. 2 is an electrical block diagram of portions 200 of the controller 104 and the selective call base station 102 in accordance with the preferred embodiment of the present invention. The controller 104 comprises a processor 203 for directing operation of the controller 104. The processor 203 is coupled to a conventional four-level FSK transmitter 202 of the selective call base station 102 for transmitting a radio signal comprising an alert signal and a message to the portable portion 101, i.e., to one of the selective call transceivers 110. The processor 203 is also coupled to at least one conventional binary FSK receiver 204 for receiving an acknowledgment signal comprising a signal quality estimate sent from the one of the selective call transceivers 110 in response to the alert signal. The at least one receiver 204 can be collocated with the selective call base station 102, as implied in FIG. 2, but preferably is positioned remote from the selective call base station 102 to avoid interference therefrom. The at least one receiver 204 is also for receiving a message corruption indication from the one of the selective call transceivers 110 in response to excessive corruption of the message by more than a predetermined number of uncorrectable errors. The signal quality estimate and the amount of message corruption are determined by the one of the selective call transceivers 110 in a manner well known in the art, as will be described further below. In addition, the processor 203 is coupled to a memory 205 comprising firmware elements for use by the processor 203.

The firmware elements comprise a selector 206 for selecting, in response to receiving the acknowledgment signal, a transmission strategy from a plurality of predetermined transmission strategies corresponding to a plurality of ranges of value of the signal quality estimate. The transmission strategy is selected in accordance with the signal quality estimate and the transmission strategy requires a matching reception strategy for compatibility. For example, if the signal quality estimate is high, the selector 206 preferably will continue to use the transmission channel utilized for sending the alert signal, while if the signal quality estimate is low, the selector 206 preferably will switch to a different transmission channel. Thus, for compatibility, a device intended to receive the new transmission strategy must also switch to the same different transmission channel.

The firmware elements further comprise a sender 212 for controlling the transmitter 202 to send to the one of the selective call transceivers 110 the message utilizing the selected transmission strategy without informing the one of the selective call transceivers 110 that the transmission strategy has been selected. The reason that the sender 212 is not required to inform the one of the selective call transceivers 110 of the transmission strategy, e.g., transmission channel, being utilized is because the one of the selective call transceivers 110 "knows" a priori what transmission strategy the selector will select, based upon the signal quality estimate sent by the one of the selective call transceivers 110. This is accomplished by pre-programming the selector 206 of the controller 104 and a selector 324 (FIG. 3) of the plurality of selective call transceivers 110 with identical tables of ranges of value of the signal quality estimate and a matching reception strategy to be utilized for each of the ranges of value. Thus, no additional message is required from the fixed portion 100 to the one of the selective call transceivers 110 to inform the one of the selective call transceivers 110 that the transmission strategy is about to change, because the one of the selective call transceivers 110 is pre-programmed to change automatically to the new matching reception strategy in response to the value of the signal quality estimate sent by the one of the selective call transceivers 110 to the fixed portion 100. The elimination of the additional message in accordance with the present invention advantageously increases efficiency of channel utilization, thereby increasing throughput compared to that of conventional selective call radio communication systems.

The firmware elements also include a reselector 214 for selecting, in a predetermined manner, a transmission strategy that is more robust than the originally selected transmission strategy, from the plurality of predetermined transmission strategies in response to receiving an indication from the one of the selective call transceivers 110 that reception of the message was corrupted by more than a predetermined amount. The amount of corruption of the message preferably is determined by the one of the selective call transceivers 110 by processing the error-detecting and error correcting signaling protocol utilized between the fixed portion 100 and the plurality of selective call transceivers 110 in a manner well known by one of ordinary skill in the art. By conventional processing of such a protocol, the selective call transceiver 110 can compute the number of uncorrectable errors in the message as received. Then, if the number of uncorrectable errors exceeds a predetermined number, the selective call transceiver 110 sends the indication that reception of the message was corrupted by more than the predetermined amount.

In addition, the firmware elements include a resender 216 for controlling the transmitter 202 to retransmit the message to the one of the selective call transceivers 110 by utilizing the selected more robust transmission strategy without informing the one of the selective call transceivers 110 that the more robust transmission strategy is being utilized. As before in the case of the sender 212, the resender 216 is not required to inform the one of the selective call transceivers 110 of the utilization of the more robust transmission strategy, e.g., changing to a more robust error correcting code format, because the one of the selective call transceivers 110 "knows" a priori which more robust transmission strategy the selector will select next, based upon the corruption indication sent by the one of the selective call transceivers 110. As before, this is accomplished by pre-programming the reselector 214 of the controller 104 and a reselector 334 (FIG. 3) of the plurality of selective call transceivers 110 with an identical, new, matching reception strategy to be utilized in case of message corruption. Thus, no additional message is required from the fixed portion 100 to the one of the selective call transceivers 110 to inform the one of the selective call transceivers 110 that the transmission strategy is about to change, because the one of the selective call transceivers 110 is pre-programmed to change automatically to the new matching reception strategy in response to the indication of message corruption sent by the one of the selective call transceivers 110 to the fixed portion 100. The elimination of the additional message in accordance with the present invention advantageously further increases efficiency of channel utilization, thereby increasing throughput compared to that of conventional selective call radio communication systems.

The firmware elements further comprise a conventional encoder/decoder 218 for encoding the alert signal and the message, and for decoding the acknowledgment signal and the indication of message corruption/noncorruption in accordance with the error detecting and error correcting protocol utilized in the selective call radio communication system. The encoder/decoder 218 operates in a conventional manner, well known by one of ordinary skill in the art.

In slightly more detail, the selector 206 comprises a first execution element 208 for executing any N of the following steps, wherein N, by way of example, is an integer value from 1 to 3: (a) selecting one of at least two transmission channels, (b) selecting one of at least two transmission rates, and (c) selecting one of at least two error correcting code formats. In other words, the first execution element 208 can execute step (a) only, step (b) only, step (c) only, steps (a) and (b), steps (a) and (c), steps (b) and (c), or all three steps. The selection of the exact steps that are executed is a matter of economics and system performance objectives. It will be appreciated that the above steps also can be shared between the selector 206 and the reselector 214. For example, in the preferred embodiment of the present invention, the selector 206 executes steps (a) and (b) only, while the reselector 214 executes step (c) only.

Changing from a first transmission channel to a second transmission channel, i.e., a channel operating on a different radio frequency, often can improve signal quality at a receiver at which multipath fading has momentarily produced a severe fade on the first transmission channel. Reducing the transmission rate, e.g., dropping the rate from 3200 sps to 1600 sps, can reduce the bit error rate when the signal quality is marginal. More errors can be corrected by changing to a code having a lower ratio of information bits to total bits (information plus parity bits), e.g., changing from a ½ rate code to a ¼ rate code when signal quality is low.

The first execution element 208 comprises a transmission enhancer 209 for selecting, as the signal quality estimate decreases below predetermined values, increasingly robust transmission strategies in a predetermined order. For example, if the signal quality estimate falls below a first level, a different transmission channel is selected, while if the signal quality estimate falls below a second (even lower)

level, a slow transmission rate is selected in addition to changing to the different transmission channel.

The selector 206 further comprises a second execution element 210 for executing any M of the following steps, wherein M is, by way of example, an integer value from 1 to 3: (d) selecting one of at least two transmitter output power levels, (e) stopping transmissions from other potentially interfering communication units operating in the selective call radio communication system, in response to the signal quality estimate being below a first predetermined value, and (f) retransmitting the alert signal at a predetermined later time, in response to the signal quality estimate being below a second predetermined value. In other words, the second execution element 210 can execute step (d) only, step (e) only, step (f) only, steps (d) and (e), steps (d) and (f), steps (e) and (f), or all three steps. The selection of the exact steps that are executed is a matter of economics and system performance objectives.

Figure 3:
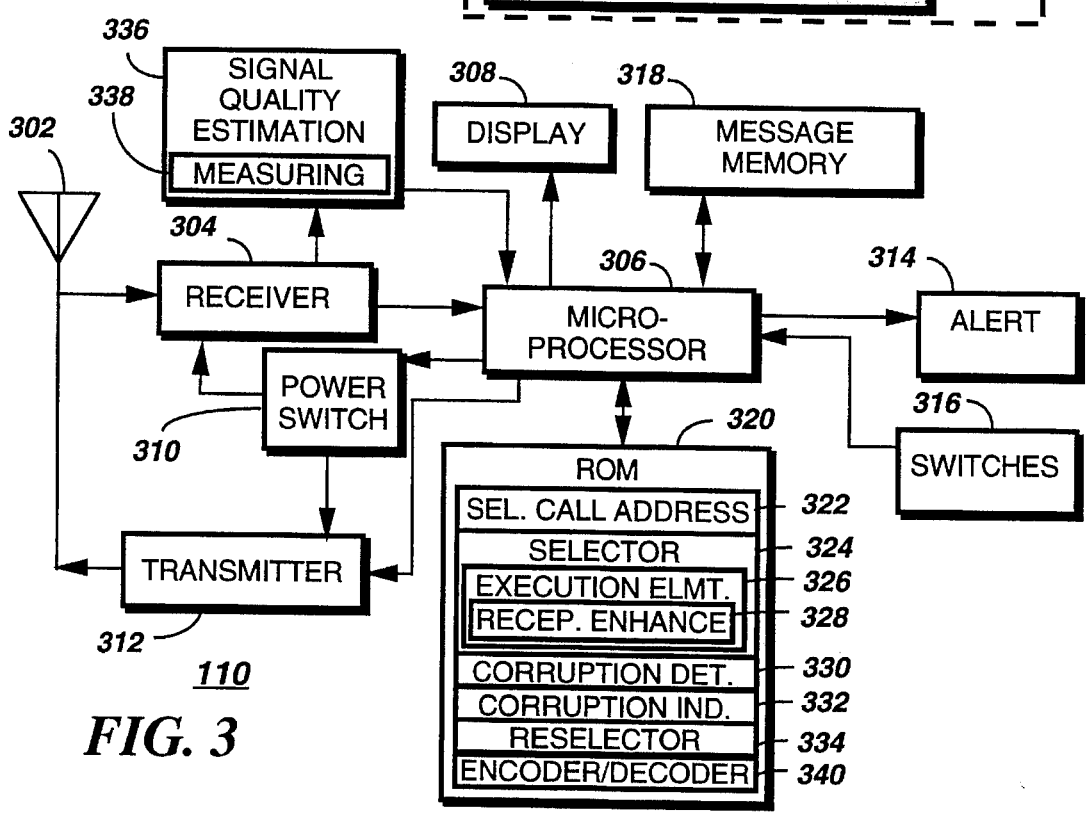
FIG. 3 is an electrical block diagram of a selective call transceiver of the selective call radio communication system in accordance with the preferred embodiment of the present invention.

With reference to FIG. 3, an electrical block diagram of the selective call transceiver 110 of the selective call radio communication system in accordance with the preferred embodiment of the present invention includes an antenna 302 for intercepting the transmitted radio signals which are coupled to the input of a conventional receiver 304. The radio signals are preferably selective call (paging) signals which provide, for example, a receiver address and an associated message, such as numeric or alphanumeric message. However, it will be appreciated that, alternatively, other well known paging signaling formats, such as tone only signaling or tone and voice signaling, would be suitable for use as well.

The receiver 304 processes the radio signals and produces at the output a data stream representative of demodulated data information. The demodulated data information is coupled into the input of a microprocessor 306 which processes the information in a manner well known in the art. A transmitter 312 is coupled to the antenna 302 and to the microprocessor 306 for sending an acknowledgment signal comprising the signal quality estimate to the fixed portion 100, in response to receiving the alert signal. The transmitter 312 is preferably a conventional binary FSK transmitter operating at a symbol rate of eight-hundred bps. It will be appreciated that other modulation techniques and symbol rates can be used as well for the transmitter 312.

A conventional power switch 310, coupled to the microprocessor 306, is used to control the supply of power to the receiver 304, thereby providing a battery saving function, and to the transmitter 312 for controlling power thereto. A signal quality estimation element 336 is coupled to the receiver 304 and coupled to the microprocessor 306 for computing a signal quality estimate based at least in part upon the alert signal as received from the fixed portion 100. Preferably, the signal quality estimation element 336 computes the signal quality estimate as an average of the quality of the alert signal as received and other transmissions ( e.g., of alert signals and messages intended for other selective call transceivers 110) received from the fixed portion 100 during a predetermined interval, e.g., two seconds, immediately prior to the transmission of the alert signal. Alternatively, the signal quality estimate can be computed from the quality of a single alert signal, but the signal quality estimate thus computed can be affected by a momentary fade and may be less accurate than the preferred (averaged) signal quality estimate.

The signal quality estimation element 336 in accordance with the preferred embodiment of the present invention comprises a conventional measuring element 338 for measuring a bit error rate (BER) of at least the alert signal as received to determine the signal quality estimate. It will be appreciated that the measuring element 338 can measure a reception characteristic selected from a group consisting of the BER, received signal strength indication (RSSI), variance of ideally discreet signal voltages received (e.g., discriminator output voltages in a frequency shift keyed system), residual noise levels during predetermined periods of silent transmission, and signal-to-noise levels during predetermined test signal transmissions. Methods for measuring the above listed reception characteristics are well known to one of ordinary skill in the art. Bit error rate and variance of ideally discreet signal voltages received are relevant methods for digital systems. Residual noise levels during predetermined periods of silent transmission, and signal-to-noise levels during predetermined test signal transmissions are relevant methods for analog systems. Received signal strength indication is relevant to both analog and digital systems. Thus, the reception characteristic measured for a specific system is a matter of the type of system, as well as design choice.

When a selective call address is received by the microprocessor 306, the received address is compared with one or more selective call addresses 322 stored in a ROM 320, and when a match is detected, a call alerting signal is generated to alert a user that a selective call message, or page, has been received. It will be appreciated that other types of memory, e.g., electrically erasable ROM (EEROM), can be utilized as well for the ROM 320. The call alerting signal is directed to a conventional audible or tactile alerting device 314 for generating an audible or tactile call alerting signal. Conventional switches 316 allow a user of the selective call transceiver 110 to, among other things, select between the audible call alerting signal and the tactile call alerting signal in a manner well known in the art.

The message information which is subsequently received is stored in a message memory 318, preferably a conventional random access memory, and can be accessed by the user for display using one or more of the switches 316, which provide such additional functions as reset, read, and delete, etc. Specifically, by the use of appropriate functions provided by the switches 316, the stored message is recovered from the message memory 318 and processed by the microprocessor 306 for displaying by a conventional display 308, such as a liquid crystal display (LCD), which enables the user to view the message. The receipt of the alert signal or of the message by the selective call transceiver 110 can automatically generate the acknowledgment response to the selective call base station 102 in accordance with the preferred embodiment of the present invention. The acknowledgment responses preferably are transmitted at a time synchronized with the radio signals received from the selective call base station 102 that originated the paging message, by techniques well known to one of ordinary skill in the art.

The microprocessor 306 preferably is implemented utilizing a microcomputer similar to the MC68HC05 series microcomputer, manufactured by Motorola, Inc. of Schaumburg, Ill. It will be appreciated that other similar microcomputers can be used as well for the microprocessor 306, and that the message memory 318, the signal quality estimation element 336, and the ROM 320 also can be included as a portion of the microprocessor 306.

The ROM 320 includes firmware elements utilized by the microprocessor 306 for controlling the selective call transceiver 110 in accordance with the preferred embodiment of the present invention. The firmware elements comprise the selector 324 for selecting a reception strategy from a plurality of predetermined reception strategies corresponding to a plurality of ranges of value of the signal quality estimate. Before the alert signal is received, a predetermined original reception strategy is selected from the plurality of predetermined reception strategies. After the alert signal has been received, the reception strategy is selected in accordance with the signal quality estimate sent in the acknowledgment signal without requiring further communication with the fixed portion 100. The reception strategy selected is uniquely compatible with a transmission strategy selected by the fixed portion 100 in accordance with the signal quality estimate. As described herein above, the reason that the selector 324 can select the reception strategy without requiring further communication with the fixed portion 100 is because the selector 324 "knows" a priori what transmission strategy the selector 206 of the controller 104 will select, based upon the signal quality estimate sent by the selective call transceiver 110. This is accomplished by pre-programming the selector 206 of the controller 104 and the selector 324 of the plurality of selective call transceivers 110 with identical tables of ranges of value of the signal quality estimate and a matching reception strategy to be utilized for each of the ranges of value. Thus, no additional message is required from the fixed portion 100 to the selective call transceiver 110 to inform the selective call transceiver 110 that the transmission strategy is about to change, because the selective call transceiver 110 is pre-programmed to change automatically to the new matching reception strategy in response to the signal quality estimate sent by the selective call transceiver 110 to the fixed portion 100. The elimination of the additional message in accordance with the present invention advantageously increases efficiency of channel utilization, thereby increasing throughput compared to that of conventional selective call radio communication systems.

The firmware elements further comprise a corruption detection element 330 for determining that the message as received was corrupted by more than a predetermined amount. The determination is made by processing the error detecting and error correcting signaling protocol utilized between the fixed portion 100 and the plurality of selective call transceivers 110 in a manner well understood by one of ordinary skill in the art. By processing such a protocol to detect and count uncorrectable errors, the selective call transceiver 110 can compute the number of uncorrectable errors in the message as received. Then, if the number of uncorrectable errors exceeds the predetermined number, the selective call transceiver 110 sends the corruption indication to indicate that reception of the message was corrupted by more than the predetermined amount. The corruption indication is sent in a manner similar to that utilized for sending the first acknowledgment signal in response to the alert signal. In addition, the firmware elements include a conventional encoder/decoder 340 for decoding the alert signal and the message, and for encoding the acknowledgment signal and the indication of message corruption/noncorruption in accordance with the error detecting and error correcting protocol utilized in the selective call radio communication system.

The firmware elements also include a corruption indicator 332 for sending the corruption indication to the fixed portion 100 that reception of the message was corrupted by more than the predetermined amount. In addition, the firmware elements include the reselector 334 for selecting a more robust reception strategy from the plurality of predetermined reception strategies. The more robust reception strategy is selected in a predetermined way without requiring further communication with the fixed portion. The more robust reception strategy selected is uniquely compatible with the more robust transmission strategy selected by the fixed portion 100 in response to the corruption indication. As described earlier, the reselector 334 is able to select the more robust transmission strategy without requiring further communication with the fixed portion, because the selective call transceiver 110 "knows" a priori what transmission strategy the selector 206 will select next, based upon the indication sent by the selective call transceiver 110. As before, this is accomplished by pre-programming the reselector 214 of the controller 104 and the reselector 334 of the plurality of selective call transceivers 110 with uniquely compatible transmission and reception strategies to be utilized in case of message corruption. Thus, no additional message is required from the fixed portion 100 to the selective call transceiver 110 to inform the selective call transceiver 110 that the transmission strategy is about to change, because the selective call transceiver 110 is pre-programmed to change automatically to the new matching reception strategy in response to the indication of message corruption sent by the selective call transceiver 110 to the fixed portion 100. The elimination of the additional message in accordance with the present invention advantageously further increases efficiency of channel utilization, thereby increasing throughput compared to that of conventional selective call radio communication systems.

The selector 324 comprises an execution element 326 for executing any N of the following steps, wherein N is, by way of example, an integer value from 1 to 3: (a) selecting one of at least two reception channels, (b) selecting one of at least two reception rates, and (c) selecting one of at least two error correcting code formats. The operation of the execution element 326 is similar, and complementary, to that described above for the first execution element 208 of the controller 104.

The selector 324 further comprises a reception enhancer 328 for selecting, as the signal quality estimate decreases below predetermined values, increasingly robust transmission strategies in a predetermined order. The operation of the reception enhancer 328 is similar, and complementary, to that described above for the transmission enhancer 209 of the controller 104.

Figure 4:
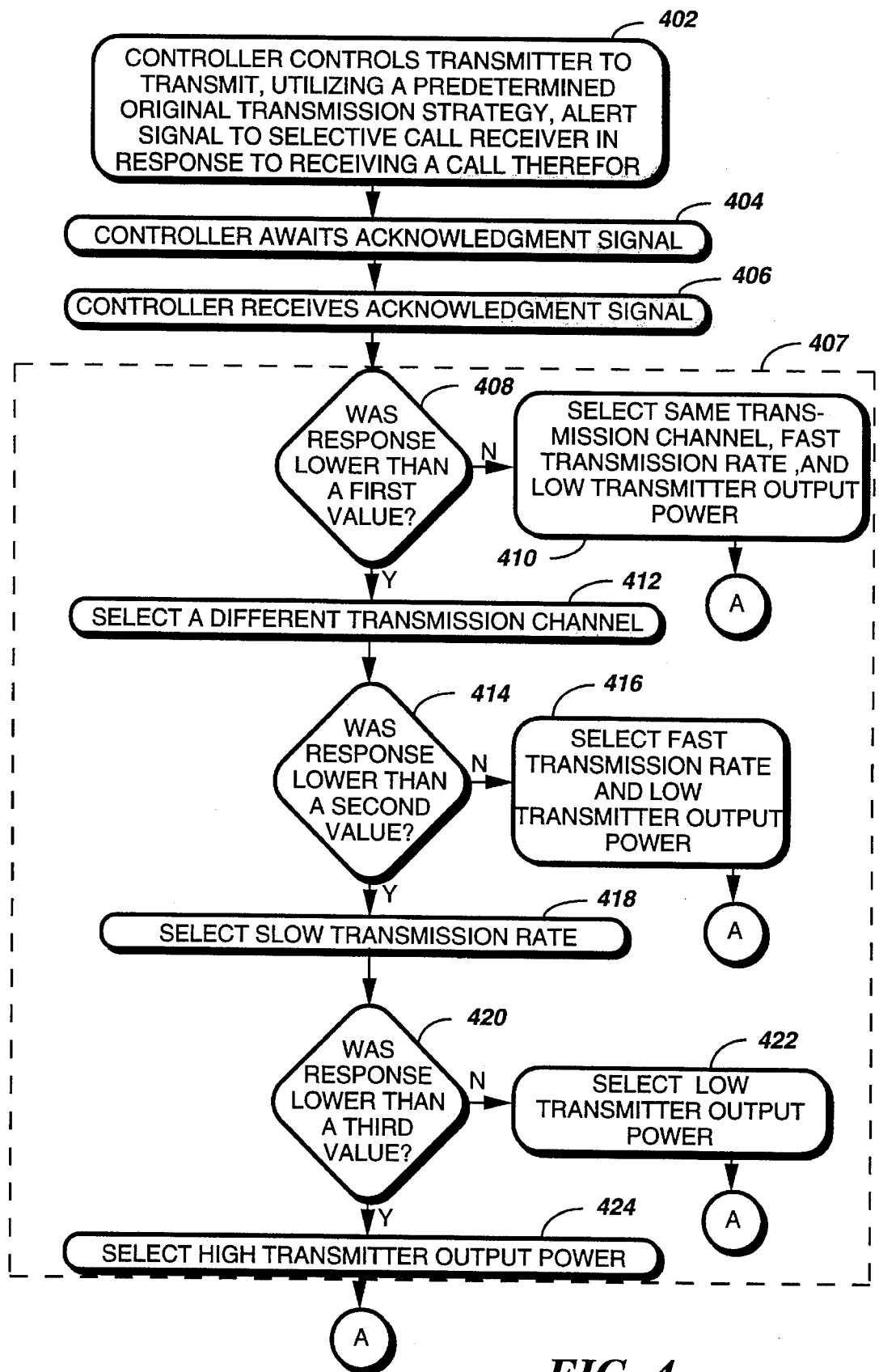
FIGS. 4 and 5 are flow charts depicting operation of the fixed portion of the selective call radio communication system in accordance with the preferred embodiment of the present invention.
Figure 5:
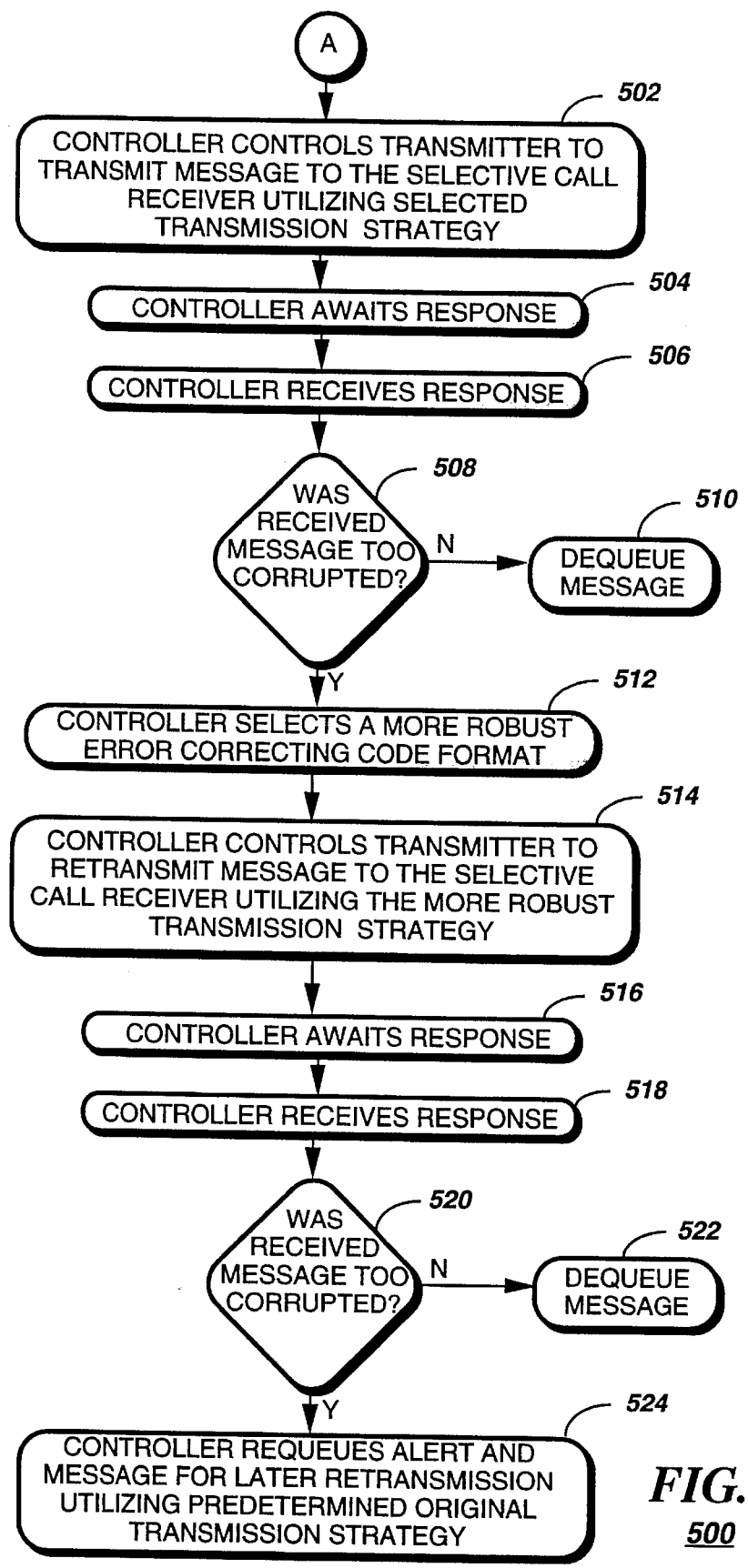

FIGS. 4 and 5 are flow charts 400, 500 depicting operation of the fixed portion 100 of the selective call radio communication system in accordance with the preferred embodiment of the present invention. FIG. 4 begins with the processor 203 of the controller 104 accessing the encoder/decoder 218 to control 402 the transmitter 202 to transmit, utilizing a predetermined original transmission strategy, an alert signal to one of the selective call transceivers 110, in response to the controller's receiving and queuing a message for the selective call transceiver 110. The predetermined original transmission strategy preferably comprises a predetermined transmission channel, a predetermined transmission rate, a predetermined transmitter power, and a predetermined error correcting code format. Preferably, the predetermined original transmission strategy is a very robust transmission strategy, e.g., a low transmission rate utilizing a high transmitter power and a low-rate error correcting code format, to maximize the probability of the alert signal being correctly received by the one of the selective call transceivers 110. The controller 104 then awaits 404 an acknowledgment signal comprising a signal quality estimate from the selective call transceiver 110 in response. After the controller 104 receives 406 the acknowledgment signal through the receiver 204, the processor 203 of the controller 104 accesses the selector 206 to perform a selection process 407 to determine a (possibly different) transmission strategy based on the signal quality estimate received. In step 408 of the selection process, the processor 203 checks whether the reported signal quality estimate was worse than a first predetermined value. If not, then the signal quality is deemed adequate, and the processor 203 selects 410 the same transmission channel utilized for sending the alert signal. In addition, the processor 203 selects a fast transmission rate, e.g., 3200 sps; and a low, e.g., 100 watt, transmitter power. Flow then continues onto the flow chart 500 of FIG. 5.

If, on the other hand, the reported signal quality estimate was worse than the first predetermined value, then the processor 203 selects 412 a different transmission channel prior to sending the message. Next, the processor 203 checks 414 whether the reported signal quality estimate was worse than a second predetermined value corresponding to a signal quality even lower than the first predetermined value. If not, the transmission channel change of step 412 should be sufficient, and the processor 203 selects 416 the fast transmission rate and the low transmitter power. Flow then continues onto the flow chart 500 of FIG. 5.

If, on the other hand, the reported signal quality estimate was worse than the second predetermined value, then the processor 203 also selects 418 a slow transmission rate, e.g., 1600 sps, prior to sending the message. Next, the processor 203 checks 420 whether the reported signal quality estimate was worse than a third predetermined value corresponding to a signal quality even lower than the second predetermined value. If not, the transmission channel change and the slow transmission rate should be sufficient, and the processor 203 selects 422 the low transmitter output power. Flow then continues onto the flow chart 500 of FIG. 5.

If, on the other hand, the reported signal quality estimate was worse than the third predetermined value, then the processor 203 also will select 424 a high transmitter output power, e.g., 500 watts, prior to sending the message. Flow then continues onto the flow chart 500 of FIG. 5, where the processor 203 of the controller 104 accesses the sender 212 to control 502 the transmitter 202 to transmit the message to the selective call transceiver 110 by utilizing the transmission strategy selected in the selection process 407. In transmitting the message the controller 104 preferably does not inform the selective call transceiver 110 concerning which transmission strategy is being utilized, because the selective call transceiver 110 has already made that determination on its own, based upon the signal quality estimate. Thus, additional communications regarding transmission strategy advantageously are eliminated. The controller 104 then awaits 504 a response from the selective call transceiver 110. When the controller 104 receives 506 the response through the receiver 204, the processor 203 checks 508 whether the response indicates that the message was received with more than a predetermined number of errors. If not, then the message is considered received, and the processor 203 can dequeue 510 the message.

If, on the other hand, the response indicates that the message was received with more than the predetermined number of errors, then the processor 203 accesses the reselector 214 to select 512 a more robust S transmission strategy. Preferably, a different error correcting code format having a higher ratio of parity bits to information bits is selected. Next, the processor 203 accesses the resender 216 to retransmit 514 the message to the selective call transceiver 110 by utilizing the more robust transmission strategy preferably without informing the selective call transceiver 110 that the more robust transmission strategy is being utilized. As explained herein above, the selective call transceiver 110 has determined utilization of the more robust transmission strategy on its own, based upon sending the corruption indication. Thus, additional communications regarding transmission strategy advantageously are eliminated.

Again, the controller awaits 516 a response. When the response is received 518 through the receiver 204, the processor 203 checks 520 whether the response again is the corruption indication, indicating that the message was received with more than the predetermined number of errors. If not, then the message is considered received, and the processor 203 can dequeue 522 the message.

If, on the other hand, the response indicates that the message was received with more than the predetermined number of errors, then the processor 203 concludes that the transmission quality is too poor to use at this time, and thus requeues 524 the message (including the alert signal) for a later retransmission attempt, utilizing the predetermined original transmission strategy. It will be appreciated that in the absence of a timely response from the selective call transceiver 110 in steps 406, 506, and 518, the preferable transmission strategy is also to requeue the message (including the alert signal) for a later retransmission attempt. It will be further appreciated that an alternative transmission strategy that can be used is to stop transmissions from potentially interfering ones of the selective call base stations 102 in response to the signal quality estimate being lower than the second predetermined value in step 414.

Figure 6:
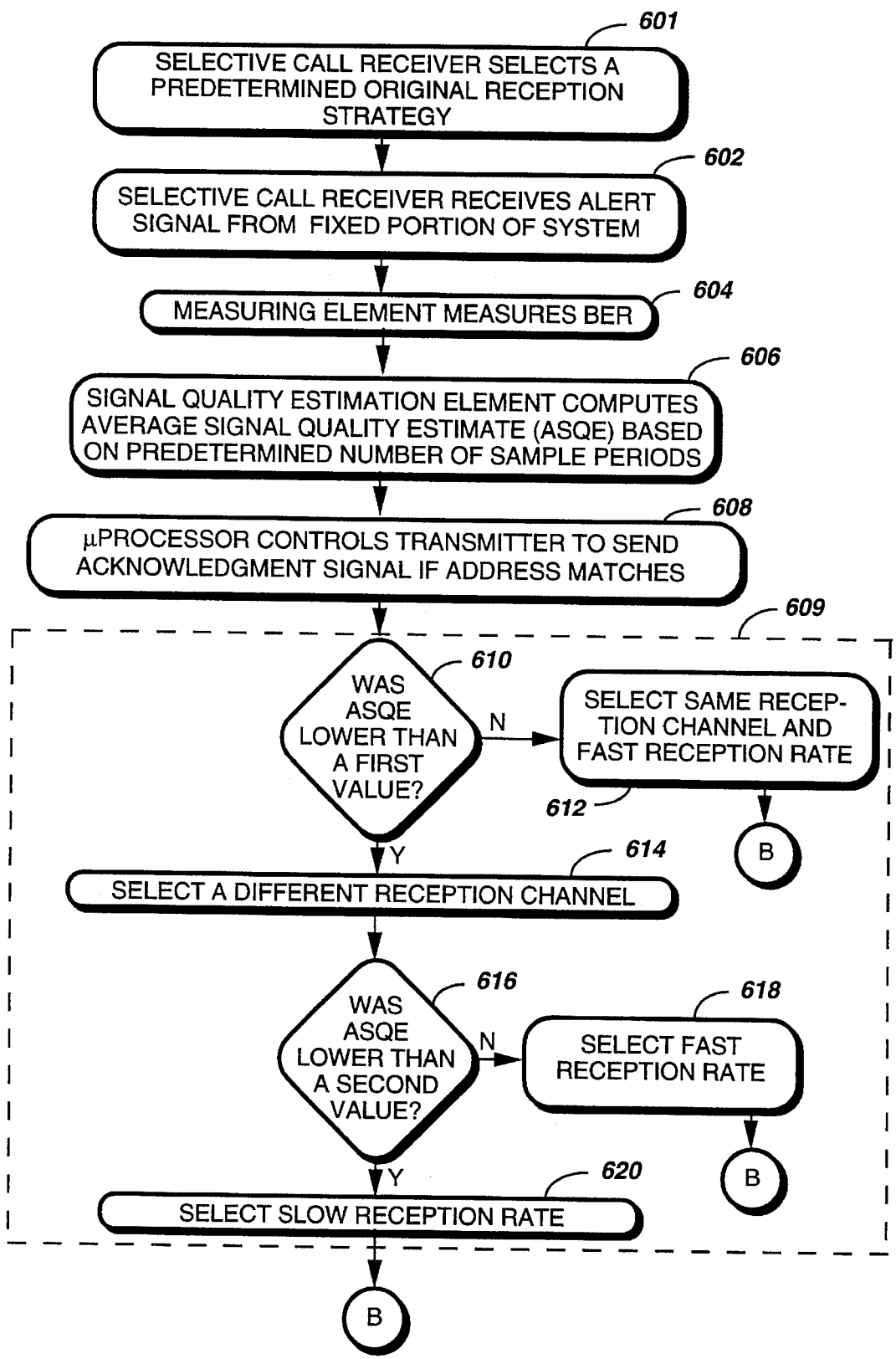

FIGS. 6 and 7 are flow charts 600, 700 depicting operation of the selective call transceiver 110 in accordance with the preferred embodiment of the present invention. FIG. 6 begins with the microprocessor 306 of the selective call transceiver 110 accessing the selector 324 to select 601 a predetermined original reception strategy. The predetermined original reception strategy preferably comprises a predetermined reception channel, a predetermined reception rate, and a predetermined error correcting code format, and is compatible with the predetermined original transmission strategy utilized by the controller 104 for sending the alert signal. Then the microprocessor 306 accesses the encoder/decoder 340 and controls the receiver 304 to receive 602 the alert signal comprising a received selective call address from the fixed portion 100 of the system. Next, the measuring element 338 preferably measures 604 the bit error rate (BER) of the alert signal. The signal quality estimation element 336 then computes 606 an average signal quality estimate (ASQE) based on the BER of a predetermined number of sample periods. Preferably, the signal quality estimation element 336 computes the signal quality estimate as an average of the quality of the alert signal as received and other transmissions (e.g., of alert signals and messages intended for other selective call transceivers 110) received from the fixed portion 100 during a predetermined interval, e.g., two seconds, immediately prior to the transmission of the alert signal. Alternatively, the signal quality estimate can be computed from the quality of a single alert signal, but the signal quality estimate thus computed can be affected by a momentary fade and may be less accurate than the preferred (averaged) signal quality estimate. It will be appreciated that, also alternatively, the BER measurement and computation of the ASQE can be performed in the microprocessor 306, as well.

If the received selective call address does not match a selective call address 322 programmed into the selective call transceiver 110, the process ends. If, on the other hand, the received selective call address matches a selective call address 322 programmed into the selective call transceiver 110, the microprocessor 306 controls 608 the transmitter 312 to send the acknowledgment signal comprising the signal quality estimate. Then the microprocessor 306 accesses the selector 324 to perform a selection process 609 to determine a reception strategy based on the signal quality estimate reported. In step 610 of the selection process, the microprocessor 306 checks whether the reported signal quality estimate was worse than a first predetermined value. If not, then the signal quality is deemed adequate and the microprocessor 306 selects 612 the same reception channel utilized to receive the alert signal. In addition, the microprocessor 306 selects a fast reception rate, e.g., 3200 sps.

If, on the other hand, the reported signal quality estimate was worse than the first predetermined value, then the microprocessor 306 selects 614 a different reception channel prior to receiving the message. Next, the microprocessor 306 checks 616 whether the reported signal quality estimate was worse than a second predetermined value corresponding to a signal quality even lower than the first predetermined value. If not, the reception channel change should be sufficient and the microprocessor 306 selects 618 the fast reception rate.

If, on the other hand, the reported signal quality estimate was worse than the second predetermined value, then the microprocessor 306 selects 620 a slow reception rate, e.g., 1600 sps prior to sending the message. Preferably, the first and second predetermined values utilized by the microprocessor 306 of the selective call transceiver 110 in determining the reception strategy are preprogrammed to be the same as the first and second predetermined values, respectively, utilized by the processor 203 of the controller 104. By preprogramming the same first and second predetermined values in the controller 104 and in the selective call transceiver 110, the transmission and reception strategies advantageously will be compatible throughout the expected range of signal quality estimates.

Flow then continues onto the flow chart 700 of FIG. 7, where the microprocessor 306 controls 702 the receiver 304 and itself to prepare for receiving the message from the fixed portion 100 of the system, utilizing the reception strategy selected in the selection process 609. Then the microprocessor 306 awaits 704 the message. When the message is received through the receiver 304, the microprocessor 306 accesses the encoder/decoder 340 to decode 706 the message. Next, the microprocessor 306 accesses the corruption detection element 330 to determine 708 whether the message as received was corrupted by more than a predetermined amount of uncorrectable errors. If not, the microprocessor 306 sends 710 a response to the fixed portion 100 of the system, indicating that the message was received OK, after which the microprocessor 306 accesses the selector 324 to return 732 to the predetermined original reception strategy.

If, on the other hand, the message as received was corrupted by more than the predetermined amount of uncorrectable errors, then the microprocessor accesses the corruption indicator 332 to send 712 a corruption indication to the fixed portion 100. Then the microprocessor 306 accesses the reselector 334 to select 714 a more robust reception strategy. Preferably, a different error correcting code format having a higher ratio of parity bits to information bits is selected. Then the microprocessor 306 controls 716 the receiver 304 and itself to prepare for receiving the message from the fixed portion 100 of the system, utilizing the more robust reception strategy selected in step 714. Then the microprocessor 306 awaits 718 the message retransmission. When the message is received through the receiver 304, the microprocessor 306 accesses the encoder/decoder 340 to decode 720 the retransmitted message. Next, the microprocessor 306 accesses the corruption detection element 330 to determine 722 whether the retransmitted message as received was corrupted by more than the predetermined amount of uncorrectable errors. If not, the microprocessor 306 sends 724 a response to the fixed portion 100 of the system, indicating that the message was received OK, after which the microprocessor 306 accesses the selector 324 to return 732 to the predetermined original reception strategy.

If, on the other hand, the retransmitted message as received was again corrupted by more than the predetermined amount of uncorrectable errors, then the microprocessor 306 again accesses the corruption indicator 332 to send 726 another corruption indication to the fixed portion 100. After sending the corruption indication, the microprocessor 306 controls the selective call transceiver 110 to return 728 to the predetermined original reception strategy and then to wait 730, preferably in a battery saving mode, for the alert and the message to be retransmitted at a later time.

Thus, the present invention provides a method and apparatus for adaptively selecting a communication strategy in a selective call radio communication system. Advantageously, the communication strategy is selected in accordance with achieving maximum throughput efficiency and economy of system design, while minimizing the amount of communication required to ensure compatibility of transmission and reception strategies.

What is claimed is:

1. A method of adaptively selecting a communication strategy for communicating a message in a selective call radio communication system comprising a fixed portion and a portable portion, the method comprising:

in the fixed portion the steps of:

transmitting, by utilizing a predetermined original transmission strategy, an alert signal to the portable portion;

thereafter awaiting an acknowledgment signal comprising a signal quality estimate from the portable portion; and selecting, in response to receiving the acknowledgment signal, a transmission strategy for sending the message from a plurality of predetermined transmission strategies corresponding to a plurality of ranges of value of the signal quality estimate, wherein the transmission strategy is selected in accordance with the signal quality estimate, and wherein the transmission strategy requires a matching reception strategy in the portable portion for compatibility; and in the portable portion the steps of:

receiving the alert signal by utilizing a predetermined original reception strategy;

computing the signal quality estimate based at least in part upon the alert signal as received;

sending the acknowledgment signal to the fixed portion after computing the signal quality estimate; and thereafter selecting the matching reception strategy for receiving the message from a plurality of predetermined reception strategies corresponding to the plurality of ranges of value of the signal quality estimate, wherein the matching reception strategy is selected in accordance with the signal quality estimate sent in the acknowledgment signal without requiring further communication with the fixed portion.

2. The method of claim 1, further comprising:

in the fixed portion the steps of:

transmitting the message to the portable portion by utilizing the transmission strategy selected;

thereafter selecting, in a predetermined manner, a more robust transmission strategy from the plurality of predetermined transmission strategies in response to receiving an indication from the portable portion that reception of the message was corrupted by more than a predetermined amount; and retransmitting the message to the portable portion by utilizing the more robust transmission strategy; and in the portable portion the steps of:

receiving the message from the fixed portion;

determining that the message as received was corrupted by more than the predetermined amount;

sending the indication to the fixed portion that reception of the message was corrupted by more than the predetermined amount; and thereafter selecting a more robust reception strategy from the plurality of predetermined reception strategies, wherein the more robust reception strategy is selected in a predetermined way without requiring further communication with the fixed portion, and wherein the more robust reception strategy selected is compatible with the more robust transmission strategy selected by the fixed portion.

3. The method of claim 1, wherein the step of computing the signal quality estimate comprises the step of measuring at least the alert signal as received to determine a reception characteristic selected from a group of reception characteristics consisting of bit error rate (BER), received signal strength indication (RSSI), variance of ideally discreet signal voltages received, residual noise levels during predetermined periods of silent transmission, and signal-to-noise levels during predetermined test signal transmissions.

4. The method of claim 1, wherein the step of selecting a transmission strategy comprises executing any N of the following steps, wherein N is an integer value from 1 to 3:

(a) selecting one of at least two transmission channels;

(b) selecting one of at least two transmission rates; and (c) selecting one of at least two error correcting code formats.

5. The method of claim 4, wherein as the signal quality estimate decreases below predetermined values, the steps (a), (b), and (c) that are executed select increasingly robust transmission strategies in a predetermined order.

6. The method of claim 4, wherein the step of selecting a transmission strategy further comprises executing any M of the following steps, wherein M is an integer value from 1 to 3:

(d) selecting one of at least two transmitter output power levels;

(e) stopping transmissions from other potentially interfering communication units operating in the selective call radio communication system, in response to the signal quality estimate being below a first predetermined value; and (f) retransmitting the alert signal at a predetermined later time, in response to the signal quality estimate being below a second predetermined value.

7. Apparatus in a fixed portion of a selective call radio communication system comprising the fixed portion and a portable portion, the apparatus for adaptively selecting a communication strategy for communicating a message, the apparatus comprising:

a transmitter for transmitting, by utilizing a predetermined original transmission strategy, an alert signal to the portable portion;

a receiver for receiving an acknowledgment signal comprising a signal quality estimate sent from the portable portion in response to the alert signal; and a controller coupled to the transmitter and coupled to the receiver for controlling the transmitter and receiving the acknowledgment signal from the receiver, the controller comprising:

a selector for selecting, in response to receiving the acknowledgment signal, a transmission strategy for sending the message from a plurality of predetermined transmission strategies corresponding to a plurality of ranges of value of the signal quality estimate, wherein the transmission strategy is selected in accordance with the signal quality estimate, and wherein the transmission strategy requires a matching reception strategy in the portable portion for compatibility; and a sender coupled to the selector for controlling the transmitter to send to the portable portion the message by utilizing the transmission strategy selected by the selector, without informing the portable portion that the transmission strategy is being utilized.

8. The apparatus of claim 7, wherein the controller further comprises:

a reselector for selecting, in a predetermined manner, a more robust transmission strategy from the plurality of predetermined transmission strategies in response to receiving an indication from the portable portion that reception of the message was corrupted by more than a predetermined amount; and a resender coupled to the reselector for controlling the transmitter to retransmit the message to the portable portion by utilizing the more robust transmission strategy without informing the portable portion that the more robust transmission strategy is being utilized.

9. The apparatus of claim 7, wherein the selector comprises a first execution element for executing any N of the following steps, wherein N is an integer value from 1 to 3:

(a) selecting one of at least two transmission channels;

(b) selecting one of at least two transmission rates; and (c) selecting one of at least two error correcting code formats.

10. The apparatus of claim 9, wherein the first execution element comprises a transmission enhancer for selecting, as the signal quality estimate decreases below predetermined values, increasingly robust transmission strategies in a predetermined order.

11. The apparatus of claim 9, wherein the selector further comprises a second execution element coupled to the first execution element for executing any M of the following steps, wherein M is an integer value from 1 to 3:

(d) selecting one of at least two transmitter output power levels;

(e) stopping transmissions from other potentially interfering communication units operating in the selective call radio communication system, in response to the signal quality estimate being below a first predetermined value; and (f) retransmitting the alert signal at a predetermined later time, in response to the signal quality estimate being below a second predetermined value.

12. A selective call transceiver for adaptively selecting a communication strategy for communicating information including an alert signal and a message in a selective call radio communication system comprising a fixed portion and the selective call transceiver, the selective call transceiver comprising:

- an antenna for intercepting a radio signal by utilizing a predetermined original reception strategy;
- a receiver element coupled to the antenna for demodulating the radio signal to produce a demodulated signal comprising the alert signal;
- a microprocessor coupled to the receiver element for decoding the demodulated signal to derive the information;
- a signal quality estimation element coupled to the receiver element and coupled to the microprocessor for computing a signal quality estimate based at least in part upon the alert signal as received from the fixed portion;
- a transmitter coupled to the microprocessor for sending an acknowledgment signal comprising the signal quality estimate to the fixed portion, in response to receiving the alert signal; and
- a selector coupled to the microprocessor for selecting a reception strategy for receiving the message from a plurality of predetermined reception strategies corresponding to a plurality of ranges of value of the signal quality estimate, wherein the reception strategy is selected in accordance with the signal quality estimate sent in the acknowledgment signal without requiring further communication with the fixed portion, and wherein the reception strategy selected is uniquely compatible with a transmission strategy selected by the fixed portion in accordance with the signal quality estimate.

13. The selective call transceiver of claim 12, further comprising:

- a memory coupled to the microprocessor for storing the message received from the fixed portion;
- a corruption detection element coupled to the microprocessor for determining that the message as received was corrupted by more than a predetermined amount;
- a corruption indicator coupled to the microprocessor for sending a corruption indication to the fixed portion that reception of the message was corrupted by more than the predetermined amount; and
- a reselector coupled to the microprocessor for selecting a more robust reception strategy from a plurality of predetermined reception strategies, wherein the more robust reception strategy is selected in a predetermined way without requiring further communication with the fixed portion, and wherein the more robust reception strategy selected is compatible with a more robust transmission strategy selected by the fixed portion in response to the corruption indication.

14. The selective call transceiver of claim 12, wherein the signal quality estimation element comprises a measuring element for measuring at least the alert signal as received to determine a reception characteristic selected from a group of reception characteristics consisting of bit error rate (BER), received signal strength indication (RSSI), variance of ideally discreet signal voltages received, residual noise levels during predetermined periods of silent transmission, and signal-to-noise levels during predetermined test signal transmissions.

15. The selective call transceiver of claim 12, wherein the selector comprises an execution element for executing any N of the following steps, wherein N is an integer value from 1 to 3:

(a) selecting one of at least two reception channels;

(b) selecting one of at least two reception rates; and (c) selecting one of at least two error correcting code formats.

16. The selective call transceiver of claim 15, wherein the execution element comprises a reception enhancer for selecting, as the signal quality estimate decreases below predetermined values, increasingly robust transmission strategies in a predetermined order.

* * * * *